Figure 1:
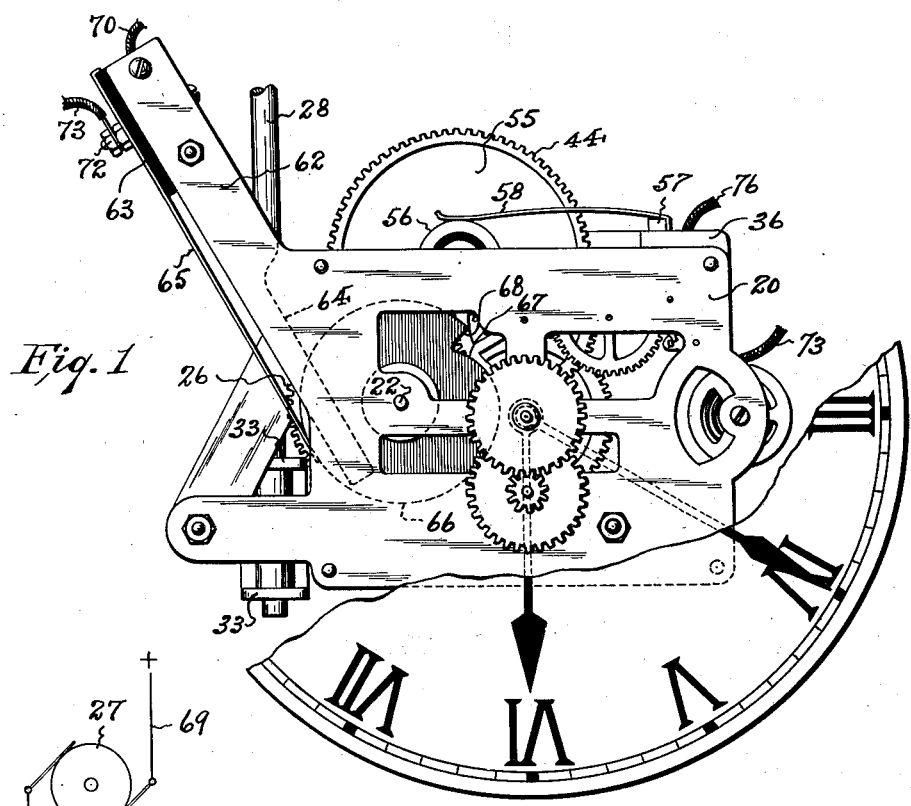

Aug. 23, 1927.

F. A. FELDKAMP 1,639,990

ELECTRIC CLOCK WINDING MECHANISM

Filed Dec. 23 1925      4 Sheets-Sheet 1

INVENTOR.
Frederick A. Feldkamp,
BY
Frantzef and Richards
ATTORNEYS.

Aug. 23, 1927.  1,639,990
F. A. FELDKAMP
ELECTRIC CLOCK WINDING MECHANISM
Filed Dec. 23 1925   4 Sheets-Sheet 2
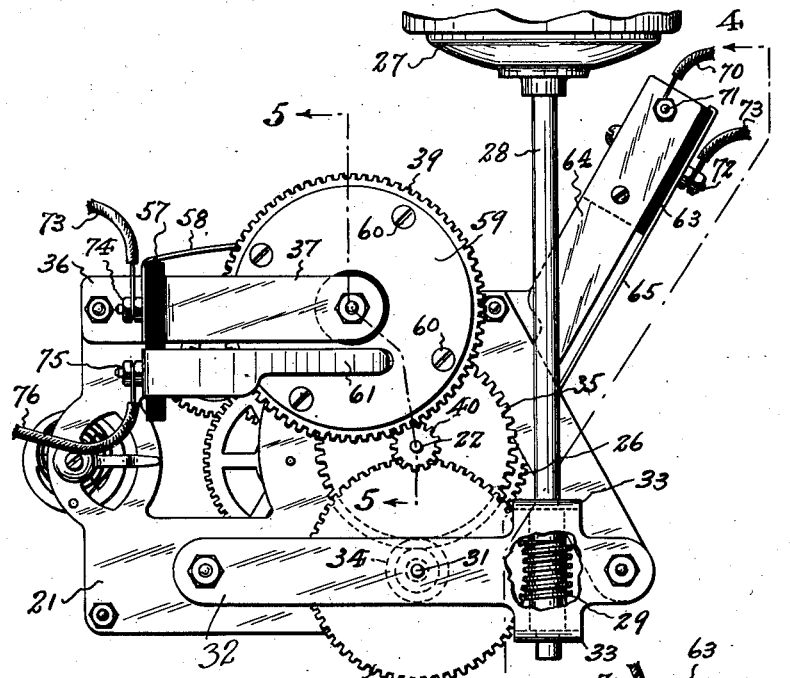
INVENTOR:
Frederick A. Feldkamp,
BY
Fraentzel and Richards
ATTORNEYS.

Aug. 23, 1927.
F. A. FELDKAMP
1,639,990
ELECTRIC CLOCK WINDING MECHANISM
Filed Dec. 23, 1925
4 Sheets-Sheet 3
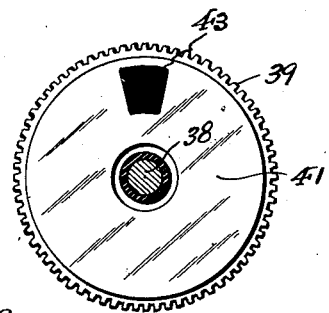
Fig. 6
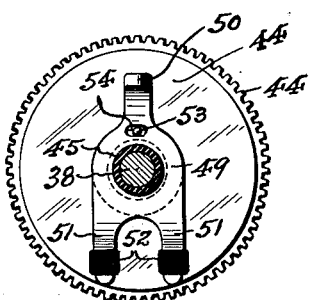
Fig. 7
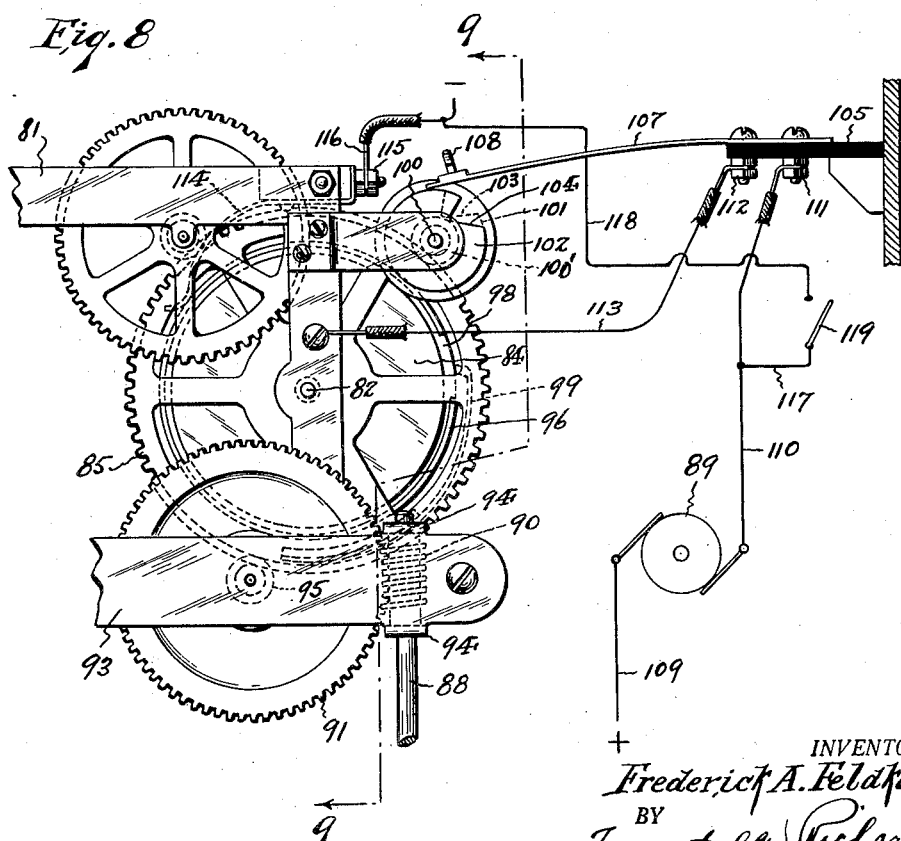
INVENTOR.
Frederick A. Feldkamp,
BY
ATTORNEYS.

Aug. 23, 1927.

F. A. FELDKAMP 1,639,990

ELECTRIC CLOCK WINDING MECHANISM

Filed Dec. 23 1925

4 Sheets-Sheet 4

INVENTOR.
Frederick A. Feldkamp,
BY
Kraeutzef and Richards
ATTORNEYS.

Patented Aug. 23, 1927.

1,639,990

UNITED STATES PATENT OFFICE.

FREDERICK A. FELDKAMP, OF NEWARK, NEW JERSEY.

ELECTRIC CLOCK-WINDING MECHANISM.

Application filed December 23, 1925. Serial No. 77,203.

This invention relates to electric clock-winding mechanism; and the invention has reference, more particularly, to electric motor actuated winding mechanism adapted for connection with ordinary lighting or power circuits, in combination with novel automatic circuit make and break means whereby the winding motor is periodically started and stopped at definite intervals to restore the expended energy of the clock spring or equivalent clock-work driving means.

The invention has for its principal object to provide in combination with an electric winding motor and its service circuit, a novel circuit control means actuated by the clock mechanism in such manner that the service circuit will be closed and the motor operated to restore the spent power of the clock spring at short time intervals or periods relative to the whole running time capacity of the clock spring or some predetermined period thereof, such rewinding intervals relative to the whole or predetermined portion of the running time capacity of the clock spring being of sufficient frequency, that a large reserve of spring capacity is always retained sufficient to maintain the clock in operation for a longer period than the total duration of accidental interruptions of the service circuit that might be likely to occur.

Other objects of this invention, not at this time more particularly enumerated, will be clearly understood from the following detailed description of the same.

To accomplish the objects of this invention, I provide a clock-work mechanism of any suitable type actuated by a spring or equivalent power element of desired predetermined total running time capacity, one end of said clock-spring being operatively arranged to exert its power upon the clock-work, and the other end of said clock-spring being operatively connected with the motor actuated winding mechanism. The service circuit is connected through the motor, and controlled by means of a novel arrangement and relation of circuit controlling devices electrically coupled in series. One circuit controlling device is moved to and continued in circuit closing condition by the unwinding or power transmitting movement of the clock-spring, and is brought to circuit interrupting condition by the winding mechanism when the clock-spring is restored to wound condition, and, consequently, unless sooner interrupted by rewinding of the spring, said circuit controlling device will remain closed during the whole or predetermined portion of the running time capacity of the clock-spring. The other circuit control device is of a make and break type held in normal circuit interrupting condition, but actuated by the unwinding or power transmitting movement of the clock-spring to periodically close the circuit at a plurality of predetermined relatively short time intervals compared with the whole or predetermined portion of the running time capacity of the clock-spring. This latter circuit control device, when closed, functions to start the motor, while the first mentioned circuit control device serves to interrupt the circuit and thus stop the motor when the clock-spring is brought to rewound condition.

To conveniently distinguish the two types of circuit controlling devices with relation to the whole or predetermined portion of the running time capacity of the actuating clock-spring, the first may be termed the total time or total time phase switch means, and the second may be termed the fractional time switch means.

To illustrate the correlative mode of operation of said total time and fractional time switch means, the following graph may be employed:—

A—a—b—c—d—e—B.

In this graph A B represents the whole running time of the clock-spring, or a predetermined proportional phase of said whole running time, e. g., thirty hours; A being the fully wound point and total time switch initially interrupted position, and B the spent point of the spring. Said total time switch is adapted to remain in circuit closing condition through the total time period A B, unless sooner interrupted. A$a$, $ab$, $bc$, $cd$, $de$ and $e$B represent the progressive periodic intervals or fractions of the whole or predetermined portion of the running time of the clock-spring, e. g. five hour periods, and $a$, $b$, $c$, $d$ and $e$ represent the moments of circuit closing operation of said fractional time switch means.

Assuming that the clock starts operation from the fully wound point A, the total time switch means will move into and continue in circuit closing condition, and by the time the clock-spring has exerted its work for and completed the period A*a*, the fractional time switch means will, at point *a*, be actuated to assume circuit closing condition, and since the already closed total time switch means and fractional time switch means are electrically coupled in series, the service circuit through the motor will close, whereupon the winding mechanism will be actuated to rewind the clock-spring, thereby returning the total time switch means to initial circuit interrupting position A, thus opening the service circuit and stopping the motor and winding mechanism actuated thereby. Under normal uninterrupted delivery of current through the service circuit, the rewinding of the clock-spring will repeatedly take place at the end of the first power transmitting period A*a* of the clock-spring. The clock-work therefore will ordinarily be operated by a substantially full-wound clock-spring, which is an important consideration and condition with reference to accurate time keeping performance of the clock, since the tension and consequently the power transmitting force of the clock-spring is maintained more nearly uniform.

Now assuming that at the moment of completion of the first power transmitting period A*a* of the clock-spring there was no current being delivered through the service circuit; in such case the clock would continue to run, under further expenditure of power by the clock-spring, through the second period *a b*, and at point *b* the fractional time switch means will again be actuated to assume circuit closing condition, and in conjunction with the already closed total time switch means, will again close the service circuit through the motor. If delivery of current through said service circuit has in the meantime been resumed, the rewinding mechanism will be operated to restore the clock-spring to fully wound condition, thus restoring the energy thereof expended by the ten hours of operation included in periods A *a* and *a b* of its whole running time capacity. If, however, the delivery of current through the service circuit is still interrupted or has again failed, the clock will continue to run, under the reserve capacity of the clock-spring, through the third period *b c*, and at point *c* the fractional time switch means will again be actuated, to close the service circuit through the motor to rewind the clock-spring and restore the energy thereof expended by the fifteen hours of operation included in periods A *a*, *a b* and *b c*.

In like manner, the motor circuit will be closed at each point *a*, *b*, *c*, *d* and *e*, representing fractional periods of the whole running time or time phase capacity of the clock-spring, and so long as current is being delivered through the service circuit at the critical time of completion of any one of said periods, the rewinding mechanism will be actuated to restore the spent energy of the clock-spring.

Failure of current delivery through the service circuit, should it occur at times intermediate the critical circuit closing moments or points *a*, *b*, *c*, *d* and *e* will not interfere with the rewinding function, since the current is only needed when the fractional time switch means operates at such critical moments or points.

From the above outline of the mode of operation of my novel plural switch control for the rewinding motor circuit, it will be understood that accidental interruptions in the delivery of current through the service circuit will be compensated for, and that the rewinding function is immune against all ordinary accidental interruptions of current service of reasonable duration, since it is highly improbable that such service, under modern conditions of current generation and distribution, would fail for periods of time beyond a few hours at the most, unless the causes assumed the proportions of a catastrophe.

Other advantages of my present invention both as to novelty of construction and mode of operation will be pointed out in the subsequent detailed description of the arrangement and construction of the parts thereof.

My invention is clearly illustrated in the accompanying drawings, in which:—

Figure 2:
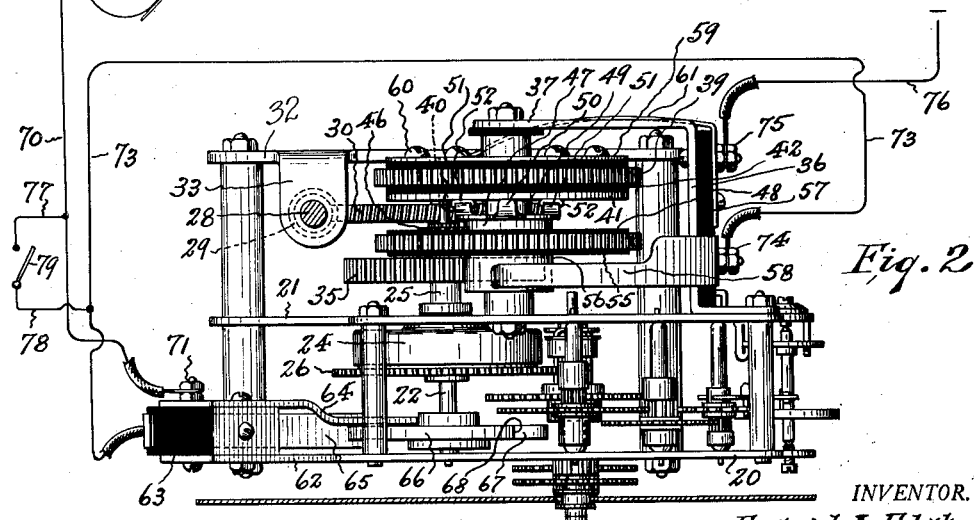

Figure 1 is a front face view of a clockwork equipped with the novel automatic control means for the service circuit of the electric winding motor; Figure 2 is a top or plan view of the same; Figure 3 is a rear face view of the same; Figure 4 is a fragmentary sectional view, taken on line 4—4 in said Figure 3; Figure 5 is a fragmentary vertical section, taken on line 5—5 in Figure 3; Figure 6 is a detail transverse vertical section, taken on line 6—6 in Figure 5; and Figure 7 is another detail transverse vertical section, taken on line 7—7 in said Figure 5.

Figure 9:
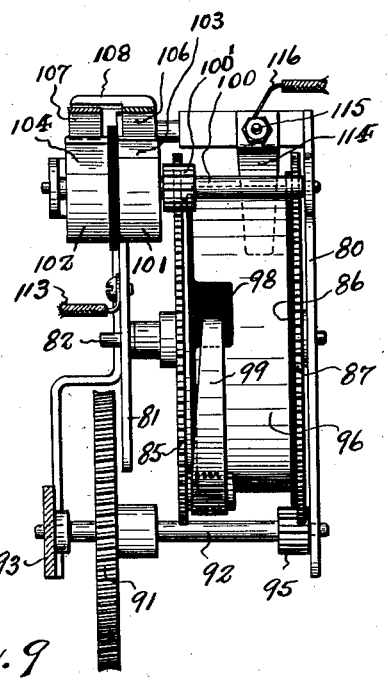
Figure 10:
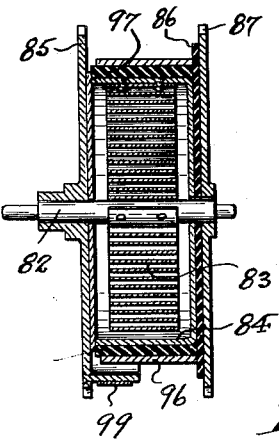
Figure 11:
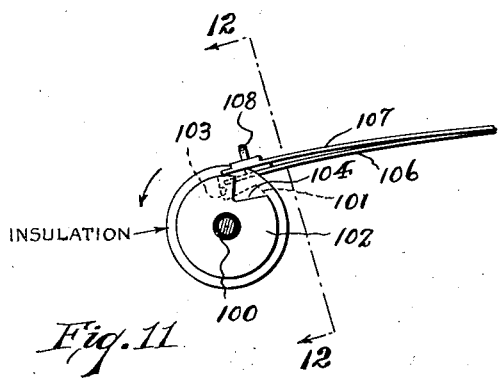
Figure 12:
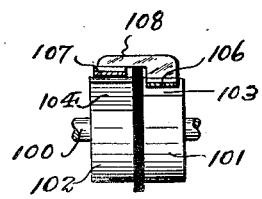

Figure 8 is a fragmentary face view of a modified form and construction of winding mechanism and automatic circuit control means, still embodying, however, the general principles of my present invention; Figure 9 is a fragmentary sectional view of the same, taken on line 9—9 in Figure 8; Figure 10 is a detail vertical section through the spring drum of the same; Figure 11 is a fragmentary view of the fractional time switch means in operative circuit closing position; and Figure 12 is a fragmentary cross section, taken on line 12—12 in said Figure 11.

Similar characters of reference are employed in all of the hereinabove described views, to indicate corresponding parts.

Referring now to Figures 1 to 7 inclusive of said drawings, the reference characters 20 and 21 respectively indicate the spaced front and rear frame members of a suitable clock-work frame, in and between which is journaled the clock-spring arbor 22. The usual spirally wound clock-spring 23 is provided, the inner end of the same being secured to said arbor 22, and the outer end of the same being secured to the enclosing spring drum 24, the rearwardly extending sleeve or hub 25 of which is freely rotatable on said arbor 22. Fixed on said arbor 22 is the spring driven main or driving gear-wheel 26 of the clock-work, which operates, through the usual clock gear train and escapement, the hands of the clock in the manner well-known to those skilled in the art.

The reference character 27 indicates any suitable form of electric motor adapted to provide the power for winding said clock-spring 23. The armature shaft 28 of said motor is provided with a worm 29 which meshes with a worm gear 30, the shaft 31 of which is journaled between the rear frame member 21 and auxiliary frame member 32. Said auxiliary frame member 32 may be provided with bearing portions 33 to rotatably support that portion of the armature shaft 28 upon which said worm 29 is fixed. Secured on the worm gear shaft 31 is a reducing gear 34 which meshes with and drives a winding gear 35 which is fixed on the sleeve or hub 25 of said spring drum 24.

Secured to said rear frame member 21 is a bracket member 36 provided with a bearing arm 37 disposed parallel to but rearwardly off-set from said rear frame member 21. Supported between said rear frame member 21 and bearing arm 37 is a stationary shaft 38 disposed in parallel relation to the rearward end of said clock-spring arbor 22.

The total time switch means, adapted to provide one element of the plural switch means for automatically controlling the service circuit of the winding motor 27, is mounted on said stationary shaft 38. This total time switch means comprises a gear wheel 39 rotatably mounted on said shaft 38. Said gear wheel 39 is driven from the clock-spring arbor 22, by a spur gear 40 fixed on the latter, preferably in such ratio that said gear wheel makes one revolution during the whole or a predetermined proportion of the running capacity of said clock-spring 23. Secured to the inner face of said gear wheel 39 is a contact-disc 41, which is insulated from the body of the former by an intervening insulation member 42. Said contact-disc 41 is provided, in flush relation to its contact face, with a neutral or circuit breaking point or section 43 formed by an inserted block of insulation material. Rotatably mounted on said shaft 38 is a second gear wheel 44, which is spaced from said gear wheel 39 by an intermediate spacing sleeve 45, preferably made of insulation material. Said gear wheel 44 is driven from the spring winding mechanism by a spur gear 46 in such manner that said gear wheel 44 will make one complete revolution when the clock-spring 23 is wound from relaxed to fully wound condition; its direction of rotation being the same as that of said gear wheel 39 under the impulsion of the clock-spring. Secured to the inner face of said gear wheel 44, so as to rotate therewith, is a contact-ring 47 which is insulated from the body of said gear wheel 44 by an intervening insulation member 48. The reference character 49 indicates a bowed resilient contact-brush, the body of which is centrally perforated for engagement over said spacing sleeve 45, and which is provided at one end with a contact-finger 50 and at the other with a pair of spaced apart tail-pieces 51, the free ends of which are tipped with insulation material 52. Said contact-brush 49 is disposed intermediate the gear-wheels 39 and 44 in such manner that it is slightly compressed, whereby its central body portion will bear against and make electrical contact with the contact-ring 47 of the gear wheel 44, while the free ends of its contact finger 50 and tail-pieces 51 will mechanically engage the contact-disc 41 of the gear wheel 39, so that the former will also electrically engage said contact-disc, but the latter will be prevented from making electrical engagement by reason of the insulation tips 52 thereof. Projecting from said contact-ring 47 is a coupling pin or stud 53 which extends through a transverse slot 54 provided in the body of said contact-brush 49 whereby rotary movement of said gear-wheel 44 and its contact-ring 47 will transmit an accompanying turning movement to said contact-brush 49, although the slot 54 allows a certain amount of lag or play for purposes subsequently to be set forth. Carried by the hub of said gear wheel 44, but insulated therefrom by an insulation member 55, is a contact-sleeve 56, which is electrically connected with said inner contact-ring 47 by pins such as the coupling pin or stud 53, which extend through the body of the gear wheel 44, but which are suitably insulated therefrom. Connected with said bracket member 36, but suitably insulated therefrom by an insulator block 57 is a stationary contact-brush 58 the free end of which electrically engages and rides on said contact-sleeve 56. Connected with but insulated from the outer side of said gear-wheel 39 is an outer contact-disc 59, which is electrically connected with the inner contact-disc 41 by screws 60 or the like, which extend through the body of the gear wheel 39, but which are suitably insulated therefrom. Supported by said bracket member 36 in connection with the insulator block 57 is a second stationary contact-brush 61, the free end of which electrically engages said outer contact disc 59.

The fractional time switch means adapted to provide the other element of the plural switch means for automatically controlling the service circuit of the winding motor 27, comprises in one form the following devices. Supported on a suitably disposed arm or extension 62 of the front frame member 20 is an insulator piece 63. Secured to and supported by said insulator piece 63 is a stationary contact-member 64. Also secured to and supported by said insulator piece 63 is a movable contact-member 65, preferably in the form of a resilient blade. Said contact-members 64 and 65 are so related one to the other, that the inherent tension of the latter will, unless prevented, cause its free end portion to engage or electrically contact with the free end portion of the former. Means are provided adapted to both normally separate said movable contact-member 65 from circuit making engagement with said stationary contact-member 64, as well as for properly controlling or timing the release of the former for circuit closing engagement with the latter. This means comprises a trip wheel or cam 66 which is fixed upon and rotated by the arbor 22. Said trip wheel or cam 66 engages by its periphery the free end of said movable contact-member 65 to hold the same normally separated from said stationary contact-member 64. Said trip wheel or cam 66 is provided in its periphery with an indented portion 67 providing a trip or releasing shoulder 68, whereby when said indented portion 67 is presented to the end of the movable contact-member 64, the same, through its inherent tension, will drop from the shoulder 68, and by such movement engage said stationary contact-member 64 so as to make circuit closing engagement therewith. Said trip-wheel or cam 66 is suitably insulated, and, to this end, may be made of an insulation material if desired.

The said total time switch means and the said fractional time switch means are electrically connected in series and so as to be included in the service circuit through the winding motor 27. One manner of so connecting the said total and fractional time switch means is shown diagrammatically in connection with Figure 2 of the drawings, in which 69 is the incoming current supply wire connected with one pole of the motor 27. Leading from the opposite pole of the motor is a conductor 70 which is connected, by a suitable binding post 71 or the like, with the stationary contact-member 64. Connected with the movable contact-member 65, by a suitable binding post 72 or the like, is a conductor 73 which is led to and connected, by a suitable binding post 74 or the like, with the contact-brush 58. Connected with the contact-brush 61, by a suitable binding post 75 is the return service circuit wire 76.

In operation, the clock-spring 23 may be initially wound by short-circuiting the fractional time switch means. Means to this end may comprise a normally open shunt circuit formed by the conductors 77 and 78 and a suitable switch 79, which is interconnected between the conductors 70 and 73. By closing the normally open manual switch 79, the service circuit through the motor 27 is closed through the wire 69, motor 27, conductors 70 and 77, through the closed manual switch 79, to and through the conductors 78 and 73 to the contact-brush 58, thence through the contact sleeve 56 to the contact-ring 47, brush 49 and its contact finger 50 to the electrically connected contact-discs 41 and 59, and thence through the contact-brush 61 and return wire 76 back to the electrical source. Upon thus closing the service circuit through the motor 27, the latter will operate through the winding gearing to wind up the clock-spring 23, thereby, at the same time bringing the contact finger 50 to initial position opposing and engaging the neutral or circuit interrupting point 43 of the contact disc 41, and consequently immediately stopping the motor 27 as the clock-spring attains fully wound condition.

Assume that the clock-spring 23 will operate for a total time period of thirty hours, and during such operation will rotate the main arbor 22 once every five hours. In such case the reduction gearing which drives the gear-wheel 39 of the total time switch means is of such ratio that said gear-wheel 39 will be caused to make one complete revolution in thirty hours, or in other words one complete revolution during the whole running time capacity of said clock-spring 23. On the other hand the arbor 22 and consequently the trip wheel or cam 66, which actuates the fractional time switch means, will be rotated once every five hours or six times during the total running time capacity of the clock-spring 23.

As the clock-work is actuated under the impulsion of the unwinding clock-spring 23, as transmitted to and through the arbor 22 and main or driving gear 26, the gear-wheel 39, which is operated from the movement of the arbor 22, will begin to rotate, while the brush 49 and its contact finger 50 will be retained relatively unmovable by the stopped winding gearing which actuates the gear wheel 44 with which said brush 49 is connected. The rotation of the gear-wheel 39 will, within a relatively short interval, move the neutral or circuit breaking point 43 of the contact-disc 41 away from the contact-finger 50, so that the latter will thereupon engage and continue in contact with said contact-disc 41 as the clock-spring 23 unwinds, thus closing the total time switch means. In the meantime, the arbor 22 will rotate the trip wheel or cam 66 of the fractional time switch means, so that, upon completion of the first fractional time period of the whole running time capacity of the clock-spring, the trip shoulder 68 will pass from under the movable contact-member 65 allowing the latter by virtue of its resiliency to drop into the indented portion 67 of said trip wheel or cam, and thus move into circuit closing relation to the stationary contact member 64. The remaining interruption of the service circuit is thereby bridged, so that current from the source may pass through the motor 27 from the service wire 69, the circuit being closed through the conductors 70, engaged contact-members 64 and 65, conductor 73, into and through the closed total time switch means by way of the brush 58, and back to the source by way of the brush 61 and wire 76. If current is being delivered through the service circuit at the time the latter is thus completed, the motor will immediately operate to rewind the clock-spring 23, and restore the energy thereof expended during its first fractional time period of power exerted by its unwinding movement. The winding gearing will rotate the spring-drum 24, to which the outer end of the spring 23 is secured, in a direction corresponding to the direction of rotation imparted by the inner end of the unwinding spring, and consequently continued actuation of the clock-work by spring power is not interrupted by the spring winding operation.

The operation of the rewinding gearing will also cause a rotation of the gear-wheel 44 in the same direction as the direction of rotation imparted to said gear-wheel 39 by the impulsion effect of the clock-spring, but at a comparatively much higher speed. The rotation of said gear wheel 44 will turn the brush 49 to carry the contact finger 50 rapidly toward the neutral or circuit interrupting point 43 of the contact-disc 41. By the time the clock-spring is restored to fully rewound condition, said contact-finger will regain engagement with said neutral or circuit interrupting point 43 of said contact-disc 41, thereupon immediately breaking or interrupting the motor service circuit, and stopping the motor while the contact-members 64 and 65 of the fractional time switch means are still operatively engaged in their circuit making position.

In order to assure the total time switch means remaining in initial circuit interrupting condition until the contact-members 64 and 65 of the fractional time switch means are separated by the continued rotation of the trip-wheel or cam 66, the contact-finger 50 of the brush 49 is caused to dwell on the neutral or circuit interrupting point 43 of the contact disc 41. This dwelling or time lag of the contact finger is permitted by reason of the slot 54, which allows the brush 49 to move with the gear-wheel 39 until the movement limiting end of the slot 54 engages the stationary stud 53. This lag provides time for sufficient advance of the trip wheel or cam 66 so that the lifting periphery thereof will cause the separation of the fractional time switch contacts 64 and 65 while the service circuit remains interrupted by the total time switch means. This arrangement is of considerable advantage, since it prevents arcing at the fractional time switch contacts 64 and 65. After the fractional time switch contacts are separated, the continued movement of the gear wheel 39 under the impulsive power of the clock spring will slowly bring the contact disc 41 and finger 50 of the brush 49 into circuit closing engagement, ready for a repetition of the above described operations.

If by any chance current delivery through the service circuit fails when the fractional time switch contacts 64 and 65 close at the end of the first fractional time period of the power capacity of the clock spring, the clock will nevertheless continue to operate, so that the trip wheel or cam 66 will make a second revolution, while the total time switch elements remain in circuit closing condition, and at the end of said second revolution the fractional time switch contacts 64 and 65 will again close. If by the time of this second closing of said contacts 64 and 65, delivery of current through the service circuit has been resumed then the motor will be actuated to rewind the clock spring to restore the expended energy of the two fractional time periods of its power capacity, and the switch devices caused to resume their initial positions, conditions and relations. As will be understood, delivery of current through the service circuit may be interrupted for one or more fractional time periods of the clock spring capacity, but, nevertheless, when resumption of current service occurs, the next or succeeding operation of the fractional time switch means, will effect a rewinding of the clock spring to initial fully wound condition, all in the manner hereinabove explained.

Referring now to Figures 8 to 12 inclusive of the accompanying drawings, I have shown a somewhat modified form and arrangement of the total time switch means and fractional time switch means, whereby the clock automatically controls the operation of its spring winding means, which embodies, however, the principles of this invention. In this modified form and arrangement, the reference characters 80 and 81 respectively indicate the spaced front and rear frame members of a suitable clock-work frame, in and between which is journaled the clock-spring arbor 82. Fixed by its inner end to said arbor 82 is the clock-spring 83, the outer end of which is fixed to the enclosing spring drum 84, which is freely rotatable on said arbor 82. Fixed on said arbor 82 is the spring driven main or driving gear-wheel 85 of the clock-work. Connected with said drum 84, but insulated electrically therefrom by the intervening insulation material 86 is a winding gear 87.

The reference character 88 indicates the armature shaft of an electric motor (diagrammatically shown in Figure 8 and indicated by the reference character 89) adapted to provide the power for winding said clock-spring 83. Said armature shaft 88 is provided with a worm 90 which meshes with and drives a worm gear 91, the shaft 92 of which is journaled in and between the front frame member 80 and an auxiliary frame-member 93 connected with said rear frame member 81. Said auxiliary frame-member 93 may be provided with bearing portions 94 to rotatably support that portion of the armature shaft 88 upon which said worm 90 is fixed. Fixed on said worm gear shaft 92 is a reducing gear 95 which meshes with and drives said winding gear 87.

The total time switch means, adapted to provide one element of the plural switch means for automatically controlling the service circuit of the winding motor 89, comprises a contact-ring 96, which is externally connected with said spring drum 84, but which is insulated electrically therefrom by the intervening insulation material 97. Said contact-ring 96 is provided, in flush relation to its contact surface, with a neutral or circuit breaking point or section 98, formed by an inserted block of insulation material. Connected with said spring driven main or driving gear-wheel 85 is a spring contact finger or brush 99 adapted to rotate therewith. The free end of said finger or brush 99 bears on said contact-ring 96, its path of contact being in line with the aforesaid circuit breaking point or section 98.

The fractional time switch means, adapted to provide the other element of the modified form of plural switch means, comprises a rotary shaft 100 journaled in and between the front and rear frame members 80 and 81. Mounted on said rotary shaft 100 is a spur gear 100' which meshes with and is driven by the spring driven main or driving gear-wheel 85 of the clock-work. Fixed on said rotary shaft 100 are a pair of trip or cam wheels 101 and 102, which are suitably electrically insulated from said shaft 100. Said trip or cam wheels 101 and 102 are respectively provided with trip notches 103 and 104. Suitably mounted in connection with the clock-casing or other stationary point or member adjacent to the clock-work, in connection with a supporting base 105 of insulating material, are a pair of resilient contact members 106 and 107 in parallel side by side relation. The free end of the contact-member 106 bears on the periphery of said cam or trip wheel 101, while the free end of the contact member 107 bears on the periphery of said cam or trip wheel 102. Connected with said contact member 106, adjacent to its free end, is a transversely off-set contact finger 108, which is normally vertically spaced or separated from and above the free end of said contact member 107, when said respective contact members are supported by the peripheries of said respective trip or cam wheels 101 and 102. Said trip or cam wheels 101 and 102 are respectively set on the shaft 100, so that the trip notch 103 of the trip wheel 101 is advanced or forwardly off-set, in the direction of the rotation, relative to the trip notch 104 of the trip wheel 102. By this arrangement, as the trip wheels rotate, the trip notch 103 is first presented to the end of said contact member 106 to release the same from the supporting periphery of said trip wheel 101, while the end of the contact member 107 is still supported by the periphery of the trip wheel 102. When this occurs, the tension of the contact member 106 moves or swings the same downward and carries its contact finger 108 into circuit closing engagement with the contact member 107, as shown more particularly in Figures 11 and 12 of the accompanying drawings. As soon as the trip notch 104 of the trip wheel 102 is presented to the end of said contact member 107, the latter also swings downward under its tension, thus again moving the contact member 107 away from the contact finger 108, whereby the contact members resume normal circuit interrupting relation.

One manner of electrically connecting in series the above described modified construction of total and fractional time switch means in the service circuit through the winding motor 89 is shown diagrammatically in Figure 8, in which 109 is the incoming current supply wire connected with one pole of the motor 89. Leading from the opposite pole of the motor is a conductor 110, which is connected through a suitable binding post or the like 111 with the contact member 106. Connected with the other contact member 107 through a suitable binding post or the like 112 is a conductor 113 which is led to and secured to the clock-work frame so as to be grounded thereon. The clock driving gear-wheel 85 being part of the ground permits the passage of current therefrom to and into the contact finger or brush 99, which, when in contact delivers the current into the insulated contact-ring 96. Supported in connection with the clock-work frame, but suitably insulated therefrom is a brush 114, the free end of which bears on the contact-ring 96. Connected with said brush 114 through a suitable binding post or the like 115 is the return service circuit 116.

In operation, the clock-spring 83 may be initially wound by short-circuiting the plural time switch devices. Means to this end may comprise a normally open shunt circuit formed by the conductors 117 and 118 and a suitable manual switch 119, which is interconnected between the conductors 117 and 118. By closing the normally open manual switch 119, the service circuit may be directly established through the motor 89, as will be apparent from an inspection of Figure 8 of the drawings.

When the service circuit is thus directly closed through the motor 89, the latter will operate through the winding gearing to turn the clock-spring to initial fully wound condition, whereupon the manual switch 119 is again opened, so that, as the spring functions to operate the clock-work, the rewinding of the spring will be automatically controlled by the plural time switch devices.

Assuming that the clock-spring 83 will rotate the arbor 82 and main clock-work driving gear-wheel 85 once in twenty-four hours, it would follow that the latter would cause the contact brush 99 to travel once entirely around the contact-ring 96 in a total time period of twenty-four hours, so that for such total time period the service circuit would continue closed so far as the total time switch means is concerned. In the meantime the driving gear-wheel 85 will, through the small spur gear 101', which we will assume possesses a six to one ratio, i. e. is rotated six times to one complete rotation of the gear-wheel 85 by which it is driven, cause a complete rotation of the trip wheels 101 and 102 of the fractional time switch means once every four hours. As the clock-spring, starting from fully wound condition, operates through the first four hours and completes such first fractional time period, the trip-wheel 101 will be advanced to a point whereby its trip notch 103 is presented to the end of the contact member 106, so that the same moves downward to carry its contact finger 108 into engagement with the contact-member 107, which is still sustained by the trip wheel 102. In this manner the remaining interruption of the service circuit is bridged, and the circuit completely closed to serve electrical current to the motor 89. If the current is being delivered through the service circuit at the time the latter is thus completed, the motor will immediately operate to rewind the clock spring 83, and restore the energy thereof expended during its first fractional time period of clock-work actuating operation. The winding gearing will rotate the spring-drum 84, to which the outer end of the spring 83 is secured, in a direction corresponding to the direction of rotation imparted by the inner end of the unwinding spring, and consequently the clock-work actuating power of the spring is not interrupted during the rewinding thereof. The rewinding movement imparted to the spring drum 84 will rotate the contact ring 96 so that its neutral or contact interrupting portion 98 will be caused to rapidly overtake the advanced contact brush 99 by the time the spring regains fully wound condition, thereupon interrupting the circuit closing relation between said contact-ring 96 and contact brush 99, and thus stopping the motor as soon as the spring 83 is restored to fully wound condition. The annularly off-set spacing of the trip notches 103 and 104 of the respective trip-wheels 101 and 102 is such that, before the contact brush 99 is entirely removed from re-engagement with the neutral or contact interrupting portion 98 of the contact-ring 96 by the continued spring actuated advance of said contact brush 99, the trip notch 104 of the trip wheel 102 will be presented to the end of the contact member 107, so that the same may in turn move downward, thus separating the same from the contact finger 108, so that the contact members 106 and 107 resume circuit interrupting relation while the service circuit remains broken by the total time switch means, and, therefore, no injurious effects such as arcing are possible under such conditions. The amount of off-set between the trip-wheel notches, assures a closing of the circuit long enough for winding purposes, while assuring the interruption of the circuit by separation of tne contacts 107 and 108 before the brush 99 leaves the insulation section 98.

It will be understood from the above description of the operation of the modified form of plural switch control, that delivery of current through the service circuit may be interrupted for one or more fractional time periods of the relatively total time period of the clock-spring operation, but, nevertheless, when resumption of current service occurs, the next or succeeding operation of the fractional time switch means, will effect a rewinding of the clock spring substantially as hereinabove explained.

I may point out that if it is desired, a clock-spring may be employed having a long time capacity, say eight days, so that e. g. the contact-disc 41 of the first described construction, or gear wheel 85 and its contact brush 99 of the second described construction, in making one complete revolution utilizes only one portion or phase of the total time capacity of the spring. In such case the total time capacity of the spring is in turn divided into total time phases, each such time phase constituting in connection with the total time switch means a total time period relative to the fractional time periods of the fractional time switch means. Under such circumstances, the clock will be rewound at the close of any one of the fractional time periods of the first total time phase of the spring capacity, as the case may be, provided delivery of current through the service is not interrupted for a length of time beyond the period of said total time phase. An advantage of such arrangement is, that a reserve of total time phases of spring capacity is provided, so that, if interruptions of current delivery continue beyond the period of the first phase, the clock will continue to run, and if current delivery is resumed during the second phase, the clock will operate and be intermittently rewound on said second phase; the same being true of the third and succeeding phases of the total time capacity of the clock spring. Such an arrangement provides insurance against the stopping or complete running down of the clock spring by reason of relatively long interruptions of current delivery through the service circuit. It will, therefore, be understood that the terms total time switch means as used in the foregoing specification and in the appended claims is intended to comprehend either the entire running time capacity of a clock-spring, or some predetermined proportional phase of such entire running time capacity of said spring, and are employed as terms for comparison of the switch means normally continued in closed condition by the clock-work actuating movement of the clock-spring relative to the switch means which is periodically or intermittently closed at comparatively short intervals by the clock actuating movement of said clock-spring.

It will be understood that many changes in details of construction of the respective long time and short time switch devices, as well as in the relative intervals of time selected for their operation, may be made within the scope of this invention as hereinabove described, and as hereinafter claimed, and consequently I do not limit this invention to the exact arrangements and combinations of the devices and parts or the details thereof as set forth in the foregoing specification; nor do I confine myself to the exact details of the construction of said parts as illustrated in the accompanying drawings.

I claim:—

1. In a spring actuated clock, an electric spring winding means including a service circuit therefor, a plurality of switch means connected in series in said circuit; one of said switch means comprising a movable contact element, transmission means actuated by the clock spring for operating said movable contact element, a cooperative normally stationary contact element, means actuated by the spring winding means to move said latter contact element in the direction of movement of said movable contact element, means to temporarily separate said contact elements when the clock spring is in fully wound or rewound condition; the other switch means comprising normally separated contact members, actuating means to intermittently close and open said contact members, and transmission means also actuated by the clock spring for operating said actuating means.

2. In a spring actuated clock, an electric spring winding means including a service circuit therefor, a plurality of switch means connected in series in said circuit; one of said switch means comprising a movable contact element, transmission means actuated by the clock spring for operating said movable contact element, a cooperative normally stationary contact element, means actuated by the spring winding means to move said latter contact element in the direction of movement of said movable contact element, means to temporarily separate said contact elements when the clock spring is in fully wound or rewound condition; the other switch means comprising normally separated contact members, actuating means to intermittently close and open said contact members, transmission means also actuated by the clock spring for operating said actuating means; and means to assure the resumption of normal separated relation of said contact members of the last described switch means while said contact elements of said first described switch means are electrically separated upon completion of a spring winding operation.

3. In a spring actuated clock, an electric spring-winding means including a service circuit therefor, a plurality of switch means connected in series in said circuit; one of said switch means comprising a movable contact element, transmission means actuated by the clock spring for operating said movable contact element, a cooperative normally stationary contact element, means actuated by the spring winding means to move said latter contact element in the direction of movement of said movable contact element, one of said contact elements having an insulated zone to coact with the other element to temporarily interrupt the same when the clock spring is in fully wound or rewound condition; the other of said switch means comprising normally separated contact members, cam means to control said contact members, transmission means actuated by the clock spring for operating said cam means to periodically close and open said contact members, and said cam means being shaped to assure opening of said contact members after completion of a winding operation and while said contact elements of said first mentioned switch means are temporarily interrupted.

4. The combination with a spring actuated clock mechanism, of a winding mechanism including an electric motor and a service circuit therefor, a spring winding drum, transmission means between said motor and drum, and a plurality of switch means connected in series in said service circuit; one switch means comprising a contact ring rotatable with but insulated from the spring winding drum and having a circuit breaking section of insulating material at one point in its circumference, a movable contact brush to cooperate with said contact ring and its circuit breaking section, transmission means actuated by the clock spring for operating said movable contact brush, means to connect said contact ring and contact brush in said service circuit; the other switch means comprising normally open make and break contact members, means to connect the same in said service circuit and in series with said first described switch means, actuating means to close said make and break contact members at periodic intervals, and transmission means actuated by the clock spring for operating said actuating means.

5. The combination with a spring actuated clock mechanism, of a winding mechanism including an electric motor and a service circuit therefor, a spring winding drum, transmission means between said motor and drum, and a plurality of switch means connected in series in said service circuit; one switch means comprising a contact ring rotatable with but insulated from the spring winding drum and having a circuit breaking section of insulating material at one point in its circumference, a movable contact brush to cooperate with said contact ring and its circuit breaking section, transmission means actuated by the clock spring for operating said movable contact brush, means to connect said contact ring and contact brush in said service circuit; the other switch means comprising normally open make and break contact members, means to connect the same in said service circuit and in series with said first described switch means, to close said make and break contact members at periodic intervals, transmission means actuated by the clock spring for operating said actuating means, and means to assure the resumption of normal open condition of said make and break contact members while said first described switch means is temporarily open after completion of a winding operation.

6. The combination with a spring actuated clock mechanism, of a winding mechanism including an electric motor and a service circuit therefor, a spring winding drum, transmission means between said motor and drum, and a plurality of switch means connected in series in said service circuit; one switch means comprising a contact ring rotatable with but insulated from the spring winding drum and having a circuit breaking section of insulating material at one point in its circumference, a movable contact brush to cooperate with said contact ring and its circuit breaking section, transmission means actuated by the clock spring for operating said movable contact, means to connect said contact ring and contact brush in said service circuit; the other switch means comprising a pair of normally separated contact members, rotary cam means, transmission means actuated by the clock spring to rotate said cam means to close said contact members at periodic intervals, said cam means being shaped to release said contact members to normally open position while said contact ring and brush of said first described switch means are temporarily open after completion of a winding operation.

In testimony, that I claim the invention set forth above I have hereunto set my hand this 22nd day of December, 1925.

FREDERICK A. FELDKAMP.